Figure 1:
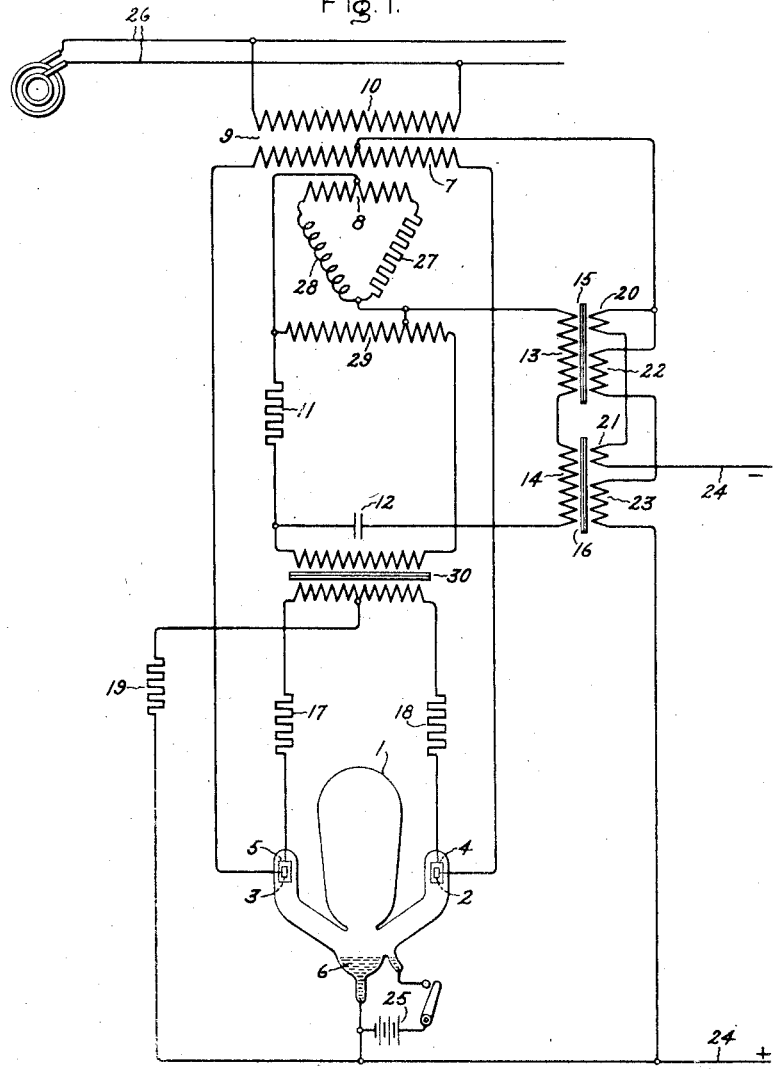

April 10, 1934.  A. SCHMIDT, JR  1,954,682
SYSTEM OF ELECTRICAL DISTRIBUTION
Filed Nov. 13, 1931

Inventor:
August Schmidt Jr,
by Charles N. Tullar
His Attorney.

Patented Apr. 10, 1934

1,954,682

UNITED STATES PATENT OFFICE 1,954,682

SYSTEM OF ELECTRICAL DISTRIBUTION

August Schmidt, Jr., Schenectady, N. Y., assignor to General Electric Company, a corporation of New York Application November 13, 1931, Serial No. 574,844

8 Claims. (Cl. 175—363)

My invention relates to systems of electrical distribution and more particularly to such systems including electric valves for transmitting energy between alternating and direct current circuits. This application is a continuation in part of my earlier filed application, Serial No. 489,148, filed October 16, 1930, and assigned to the same assignee as the present application.

Electric valve rectifying apparatus, such, for example, as mercury arc rectifiers, have come into extensive use for supplying metropolitan direct current networks from alternating current feeder circuits. In this type of installation, where a continuity of service is so important that no overload protective apparatus is used, it is desirable that the apparatus shall have regulation characteristics which will allow it to maintain a network voltage substantially constant or slightly increasing from no load to full load, and a voltage having a decidedly drooping characteristic at loads in excess of its normal rating. With this type of regulation characteristic the apparatus may be maintained in service up to practically short circuit on the direct current network.

It is an object of my invention, therefore, to provide an improved system of electrical distribution including an electric valve suitable for transmitting energy from an alternating current circuit to a direct current circuit by means of which the above mentioned desirable regulation characteristic may be obtained.

It is a further object of my invention to provide an improved system of electrical distribution including an electric valve suitable for transmitting energy from an alternating current to a direct current circuit in which the voltage of the direct current circuit may be maintained substantially constant for loads less than a predetermined value and in which the voltage of the direct current circuit will decrease rapidly in response to increase of load current above the determined value.

In accordance with my invention, a direct current circuit is energized from an alternating current circuit through a pair of electric valves preferably of the vapor electric discharge type. The grids of the electric valves are controlled from an impedance phase shifting circuit energized from the alternating current circuit and including a saturable reactor. The saturable reactor is provided with separate saturating windings, one of which is energized in accordance with the potential of the direct current circuit, and the other of which is differentially energized in accordance with the load current of the direct current circuit.

Figure 3:
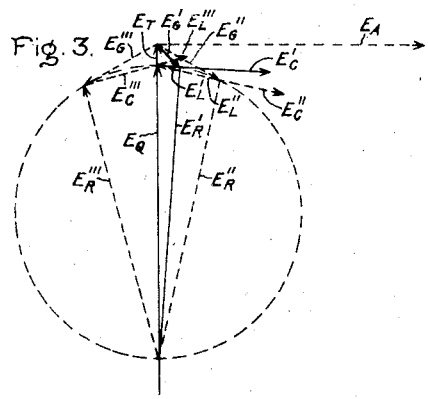

For a better understanding of my invention, together with other and further objects thereof, reference is had to the following description taken in connection with the accompanying drawing, and its scope will be pointed out in the appended claims. In the drawing, Fig. 1 illustrates an embodiment of my invention for transmitting energy from a single phase alternating current circuit to a direct current load circuit, while Figs. 2 and 3 are vector diagrams to aid in the understanding of my invention.

Figure 2:
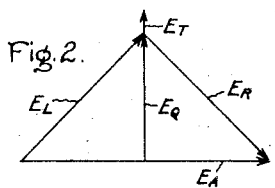

Referring now to Fig. 1 of the drawing, there is illustrated an electric distribution system embodying my invention. By way of example, I have illustrated a pair of electric valves combined in a single vapor electric device 1 provided with anodes 2 and 3, control electrodes or grids 4 and 5, respectively, and a cathode 6, although it will be apparent to those skilled in the art that electric valves of any of the several types well known in the art, such, for example, as valves of the higher vacuum pure electron discharge type, are equally suitable and that the separate valves including the anodes 2 and 3 may be enclosed in separate containers if desired. The cathode 6 may be maintained in an excited condition by any suitable arc maintaining circuit 25, as illustrated. The direct current circuit 24 is adapted to be energized through the vapor electric device 1 from the secondary winding 7 of a transformer 9, the primary winding of which is connected to an alternating current circuit 26. By way of example, I have illustrated the conventional full wave rectifier connection, one side of the direct current circuit being connected to the electrical midpoint of the winding 7 through the windings 20 and 21, to be described hereinafter, and the other side of the direct current circuit being connected directly to the cathode 6 of the vapor electric device 1.

In order to control the energy flowing through the vapor electric device 1 and thus secure the desired regulation characteristics of the direct current circuit 24, the transformer 9 is provided with a tertiary winding 8 from which is energized a suitable phase shifting circuit for exciting the control grids 4 and 5 of the vapor electric device 1. This phase shifting circuit includes a fixed impedance phase shifting bridge comprising a resistor 27 and a reactor 28 connected across the winding 8 for securing an alternating potential substantially in quadrature with that of the circuit 26. A second impedance phase shifting circuit comprising a resistor 11, a capacitor 12 and saturable reactors 13 and 14 is connected to be energized from this quadrature potential. An autotransformer 29 is also energized from this quadrature potential, while the primary winding of a grid transformer 30 is connected between the outer terminal of the autotransformer 29 and the junction between the resistor 11 and capacitor 12 of the impedance phase shifting circuit. The control grids 4 and 5 are energized from the opposite halves of the secondary winding of the grid transformer 30 through current limiting resistors 17 and 18 and a common resistor 19 interposed in the connection to the cathode 6. Saturable reactors 13 and 14 are provided with core members 15 and 16 and saturating windings 20 and 21, respectively, connected in series with the direct current circuit and with saturating windings 22 and 23, respectively, connected across the direct current circuit. The windings 20 and 21, and 22 and 23 are differentially wound with respect to the cores 15 and 16 of the reactors 13 and 14, respectively, and are so proportioned that at approximately normal load on the apparatus, the saturating effect of shunt windings 22 and 23 is just neutralized by that of the series windings 20 and 21. While I have illustrated two separate saturable reactors, preferably so connected that the components of alternating potential induced in the direct current windings are neutralized, it will be obvious to those skilled in the art that the windings may be combined on a single magnetic core if desired. However, this feature of deriving from an alternating current circuit an alternating potential variable in phase, by means of an impedance phase shifting circuit including a saturable reactor, the saturation of which is varied in response to an electrical condition of a direct current circuit forms no part of my present invention but is disclosed and claimed in the copending application of Myron Zucker, Serial No. 530,878, filed April 17, 1931, and assigned to the same assignee as the present application.

The general principle of operation of a controlled rectifier of the type just described is well understood by those skilled in the art, so that a detailed explanation is not deemed necessary. In general, with the potentials impressed on the control grids 4 and 5 in phase with their respective anode potentials, the maximum current is delivered by the converting apparatus, limited solely by the impedance of the direct current circuit 24. By retarding the phase of the grid potentials with respect to the anode potentials of the device 1, the points in the cycle of alternating potential at which the valve paths including the anodes 2 and 3 are rendered conductive, are successively retarded, each valve path is conductive for only a fraction of the positive half cycle of anode potential, and the average voltage impressed upon the direct current circuit 24 is reduced.

The operation of the control arrangement described above will be best understood by referring to the vector diagrams of Figs. 2 and 3. In Fig. 2 the vector $E_A$ represents the anode potential of one of the anodes, for example, anode 2; the vector $E_L$, the potential across reactor 28; the vector $E_R$, the potential across resistor 27; the vector $E_Q$, the quadrature potential derived from the impedance phase shifting circuit, and the vector $E_T$, the secondary potential of the auto transformer 29. In Fig. 3 the vectors $E_A$, $E_Q$ and $E_T$ represent the same quantities as in Fig. 2, but are somewhat exaggerated in scale for the sake of clarity. With no load on the apparatus, the reactors 13 and 14 are slightly saturated by the shunt windings 22 and 23, respectively, so that their inductance is somewhat less than when in an unsaturated condition. The capacitor 12 is so chosen that its reactance is approximately half that of the reactors 13 and 14 when in an unsaturated condition. Assuming no load on the apparatus, the potential appearing across resistor 11 is represented in Fig. 3 by the vector $E_R'$, the potential across capacitor 12, by $E_C'$, that across the reactors 13 and 14, by the vector $E_L'$, while the potential between the outer terminal of the winding 29 and the junction between resistor 11 and capacitor 12, which is impressed upon the primary winding of grid transformer 30, is represented by the vector $E_G'$. It will be assumed now that, when normal load is placed upon the apparatus, the saturating effect of the series windings 20 and 21 substantially neutralizes that of the windings 22 and 23, with the result that the inductance of the reactors 13 and 14 is increased to a maximum. Under these conditions, the net inductive reactance of the circuit including resistor 11, capacitor 12 and reactors 13 and 14, is increased, and these conditions may be represented by similar vectors each with a double prime. It will be seen that the potential applied to the control grids has advanced in phase from the position $E_G'$ to the position $E_G''$ with the result that the average voltage of the direct current circuit 24 is increased. In the foregoing explanation, the natural regulation characteristics of the apparatus including the power transformer 9 and the vapor electric device 1, have been neglected. By proper selection of the constants of the above described grid control circuit, the grid potential may be advanced with increasing load by an angle just sufficient to compensate for the natural regulation characteristics of the power circuit, so as to maintain a substantially constant output voltage, or it may be advanced at such a rate as to give a compounding effect upon the direct current circuit, as will be well understood by those skilled in the art. Upon further increases in load current, reactors 13 and 14 will again become saturated by the windings 20 and 21, and the phase of the grid potentials will be retarded in a manner opposite that described above to lower the potential of the direct current circuit. It will be noted that, since the shunt windings 22 and 23 are energized from the circuit 24, their saturating effect will decrease with a decrease in the potential of the circuit 24, so that saturation of the reactors by the series windings takes place at an accelerated rate. Conditions of extremely heavy load on the direct current circuit are illustrated by the vectors of Fig. 3 indicated by a triple prime. Under these conditions, it will be seen that the inductance of the reactors 13 and 14 is substantially a minimum and the grid potential $E_G'''$ has been retarded into a position closely approximating phase opposition with respect to the anode potential so that the potential of the load circuit is reduced to a very low value. With such an arrangement, it will be apparent that the rectifying apparatus may be operated even under short circuit conditions on the direct current circuit without substantially overloading the equipment.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In a system of distribution, a supply circuit, a load circuit, means including an electric valve for controlling the energy transmitted between said circuits, means for controlling the conductivity of said valve including a saturable reactor, and means responsive to the energy transmitted between said circuits for varying the saturation of said reactor in one sense for a predetermined range of operation and for varying said saturation in an opposite sense for another range of operation.

2. In a system of distribution, a supply circuit, a load circuit, means including an electric valve for controlling the energy transmitted between said circuits, means for controlling the conductivity of said valve including a saturable reactor, and means responsive jointly to the current and potential of said load circuit for varying the saturation of said reactor in one sense for increasing values of current over a predetermined range of operation and for varying said saturation in an opposite sense for increasing values of current over another range of operation.

3. In a system of distribution, an alternating current supply circuit, a load circuit, an electric valve interconnecting said circuits for transmitting energy therebetween, means for controlling the conductivity of said valve including a saturable reactor, means for saturating said reactor in response to the potential of said load circuit, and means for differentially saturating said reactor in response to the load current whereby the load circuit is given a rising volt ampere characteristic for load currents less than a predetermined value and a falling volt ampere characteristic thereafter.

4. In a system of distribution, an alternating current supply circuit, a load circuit, an electric valve interconnecting said circuits for transmitting energy therebetween, means for controlling the conductivity of said valve including a saturable reactor, a saturating winding for said reactor connected in shunt to said load circuit, a second saturating winding connected in series with said load circuit and acting differentially with respect to said shunt winding, whereby said load circuit is given a rising volt ampere characteristic for values of load current within a predetermined range and a falling characteristic for values of load current within another range.

5. In a system of distribution, an alternating current supply circuit, a load circuit, means for transmitting energy therebetween including an electric valve provided with a control grid, an impedance phase shifting circuit energized from said alternating current circuit and including a saturable reactor, a circuit for energizing said control grid from said phase shifting circuit, means for saturating said reactor in response to the potential of said load circuit, and means for differentially saturating said reactor in response to the load current, whereby the load circuit is given a rising volt ampere characteristic for values of load current within a predetermined range and a falling volt ampere characteristic for values of load current within another range.

6. In a system of distribution, an alternating current supply circuit, a load circuit, means for transmitting energy therebetween including an electric valve provided with a control grid, an impedance phase shifting circuit energized from said alternating current circuit and including a capacitor and a saturable reactor, the reactance of said capacitor being intermediate that of said reactor in its saturated and unsatuated conditions, a circuit for energizing said control grid from said phase shifting circuit, means for saturating said reactor in response to the potential of said load circuit, and means for differentially saturating said reactor in response to the load current, whereby the load circuit is given a rising volt ampere characteristic for values of load current within a predetermined range and a falling volt ampere characteristic for values of load current within another range.

7. In a system of distribution, an alternating current supply circuit, a load circuit, means for transmitting energy therebetween including an electric valve provided with a control grid, means for deriving from said alternating current circuit an alternating potential substantially in quadrature with that of said circuit, an impedance phase shifting circuit energized from said quadrature potential and including a saturable reactor, a circuit for energizing said control grid from said phase shifting circuit, means for saturating said reactor in response to the potential of said load circuit, and means for differentially saturating said reactor in response to the load current, whereby the load circuit is given a rising volt ampere characteristic for values of load current within a predetermined range and a falling characteristic for values of load current within another range.

8. In a system of distribution, an alternating current supply circuit, a load circuit, means for transmitting energy therebetween including an electric valve provided with a control grid, means for impressing an alternating potential upon said grid, and means responsive jointly to the potential and current of said load circuit for advancing the phase of said grid potential for increasing values of load current below a predetermined value and thereafter retarding the phase of said grid potential, whereby said load circuit is given a rising volt ampere characteristic below said predetermined value and a falling volt ampere characteristic beyond said value.

AUGUST SCHMIDT, Jr.